United States Patent [19]

Lienard et al.

[11] Patent Number: 4,916,544

[45] Date of Patent: Apr. 10, 1990

[54] METHOD AND DEVICE FOR COMPRESSION BY THE CONDITIONAL ENCODING OF DIGITAL IMAGE SIGNALS WITHOUT LOSS OF DATA

[75] Inventors: Jean Lienard, Clamart; Claude Benchimol, Paris, both of France

[73] Assignee: Thomson-CGR, Paris, France

[21] Appl. No.: 80,532

[22] PCT Filed: Dec. 2, 1986

[86] PCT No.: PCT/FR86/00413

§ 371 Date: Sep. 24, 1987

§ 102(e) Date: Sep. 24, 1987

[87] PCT Pub. No.: WO87/03769

PCT Pub. Date: Jun. 18, 1987

[30] Foreign Application Priority Data

Dec. 4, 1985 [FR] France ............................ 85 17949

[51] Int. Cl.$^4$ .............................................. H04N 1/40
[52] U.S. Cl. .................................. 358/262.1; 358/426
[58] Field of Search ............... 358/260, 261, 261.1, 358/261.2, 261.3, 261.4, 262.1; 382/56; 341/67

[56] References Cited

U.S. PATENT DOCUMENTS

| | | | |
|---|---|---|---|
| 4,121,259 | 10/1978 | Preuss et al. | 358/261 |
| 4,179,710 | 12/1979 | Ishiguro | 358/135 |
| 4,325,085 | 4/1982 | Gooch | 358/260 |
| 4,491,953 | 1/1985 | Bellisio | 358/135 |
| 4,542,411 | 9/1985 | Imanaka et al. | 358/260 |
| 4,618,846 | 10/1986 | Ross | 358/261 |
| 4,646,148 | 2/1987 | Lienard | 358/135 |
| 4,688,100 | 8/1987 | Haganuma | 358/260 |
| 4,739,308 | 4/1988 | Lienard | 340/347 DD |
| 4,785,356 | 11/1988 | Gonzales et al. | 358/133 |

FOREIGN PATENT DOCUMENTS

81/00181  1/1981  World Int. Prop. O. .

OTHER PUBLICATIONS

IEEE Transactions on Communication Technology, vol. COM-15, No. 2, Avril 1967 (New York, US); F. K. Manasse: "Directional Correlation—A Technique to Reduce Bandwidth in PCM Television Transmissions", pp. 204–208, voir p. 205, Colonne de Droite, ligne 9—p. 208, Colonne de Gauche, ligne 12.

Proceedings of the IEEE, vol. 124, No. 12, Decembre 1977 (Stevenage, GB); V. G. Devereaux: "Differential Coding of Pal Video Signals Using Intrafield Prediction", pp. 1139–1147, voir p. 1139, Volonne de Droite, ligne 29—p. 1143, Colonne de Droite, ligne 18.

Funkschau, vol. 45, No. 16, 3 aout 1973, (Munich, DE); H. Schonfelder: "Nachrichtenreduktion fur Bildsignale", pp. 591–593, voir le document an entier.

*Primary Examiner*—Edward L. Coles, Sr.
*Assistant Examiner*—Jerome Grant, II
*Attorney, Agent, or Firm*—Oblon, Spivak, McClelland, Maier & Neustadt

[57] ABSTRACT

To compress the values of the pixels of a digitalized image, the values of the pixels neighboring the pixel to be processed are memorized and, according to their respective values, a code number is produced leading to the encoding process according to a composed code or to the encoding of the pixel itself, with a prefix. The successive codes are formatted and concatenated to be memorized.

4 Claims, 2 Drawing Sheets

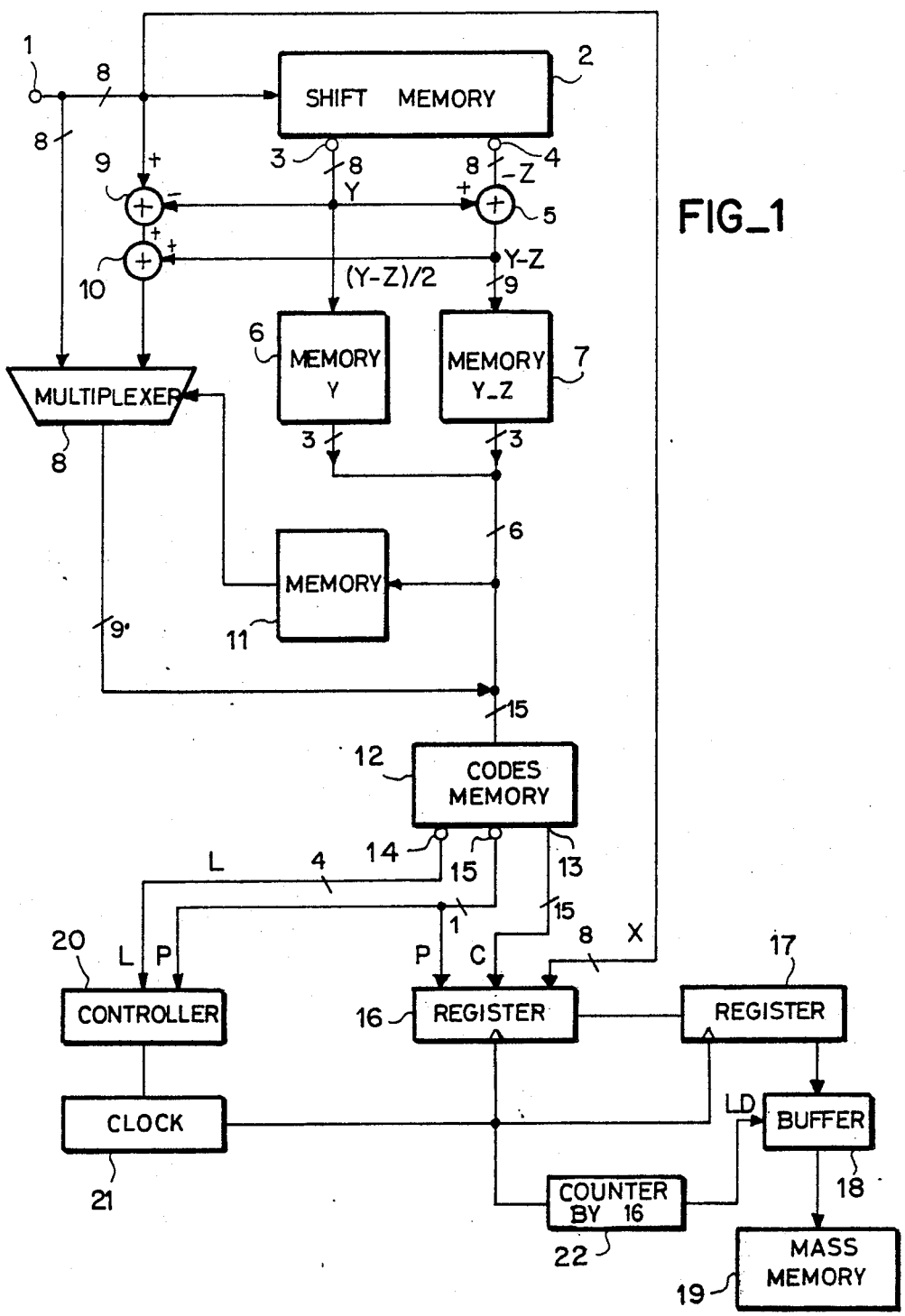
FIG_1

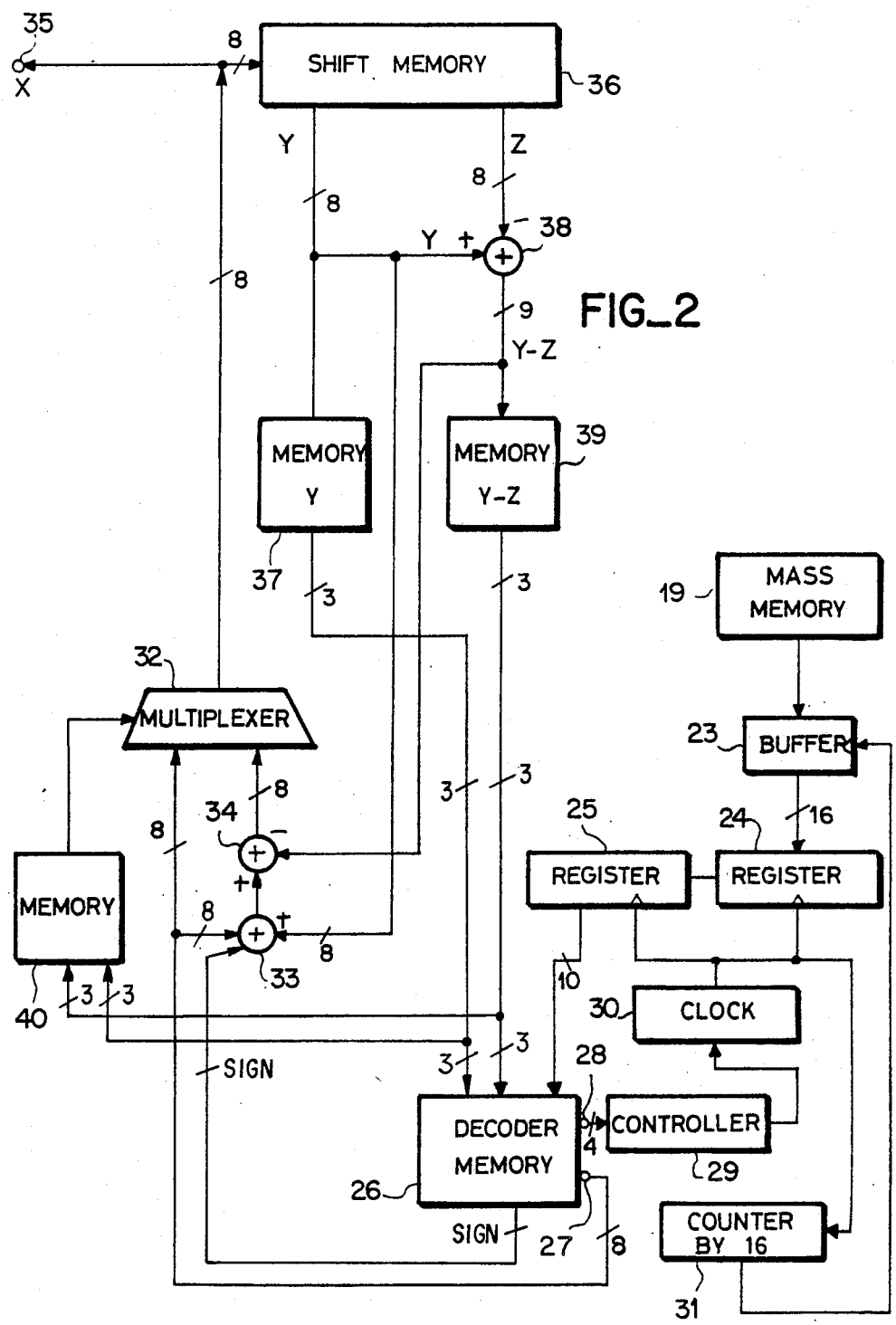
FIG_2

METHOD AND DEVICE FOR COMPRESSION BY THE CONDITIONAL ENCODING OF DIGITAL IMAGE SIGNALS WITHOUT LOSS OF DATA

BACKGROUND OF THE INVENTION

1. Field of Invention

The present invention relates to a method and a device for compression by conditional encoding of digital image signals without loss of data.

2. Description of the Prior Art

In the prior art, the French patent application 8318132 describes a method for the compression of digital data representing the pixels of a digitalized image. This method gives a good rate of compression without loss of data while previous methods gave worthwhile compression rates but with a certain deterioration of the image, hence with loss of information, which rules out its use for radiographic pictures in medicine.

However, in certain uses, for example when obtaining digitalized angiographic images, which have to be stored by taking up as little memory as possible and at video rate, the compression rates obtained by the method of the said French patent application are not sufficient. Furthermore, the article by H. Gharavi, "Conditional Variable-length Encoding for Gray-level Pictures", published in the BSTJ, volume 63, No. 2., Feb. 1984, describes a method for compression by conditional encoding, but this method is based on an image, the digitalization of which (on three bits) induces a distortion with respect to the original image.

3. Summary of the Invention

The object of the present invention is a method for the compression of digital data by which it is possible to obtain a high compression rate without loss of data, and its object is also a device for the application of this method, which is simple and inexpensive to make.

The method of the present invention consists in making a conditional encoding for each pixel of the digitalized image by assigning a variable-length code to each current pixel, taking into account its value and the values of at least two neighbouring pixels. According to an advantageous feature of the invention, the various codes are combined into a smaller number of encoding classes which all exhibit substantially the same probability of appearance, and several values of less frequently occurring codes, which are distinguished by a suffix, are combined under one and the same prefix.

The device to apply the invention essentially comprises a random-access memory which memorizes the values of successive pixels of an analyzed image, the number of pixels being at least equal to the number of pixels contained in one line of this image, this random-access memory being connected to a converter device which gives numbers of encoding classes according to the respective values of the pixels neighbouring the standard pixel, this converter device being connected to a encoding device which, according to the numbers of the classes referred to above, gives corresponding variable-length codes.

In order to enable the codes of successive pixels of an analyzed image to be memorized, the device of the invention comprises a concatenation formatter which essentially comprises a register with parallel inputs, the serial output of which is connected to a serial input of another register of the same capacity with parallel outputs, the inputs of the first of these registers being connected to the said encoding device and the outputs of the second register being connected to a bulk memory, the said encoding device comprising a variable-length code length output connected by a controller to a clock which is itself connected to the clock signal inputs of the two registers and to a counter with a number of counting states equal to the capacity of each of the two registers, the output of this counter, actuated upon the arrival of the last counting state, being connected to the validation command input for the outputs of the second register referred to above.

BRIEF DESCRIPTION OF THE DRAWINGS

The present invention will be better understood from the following detailed description of an embodiment, taken as a non-exhaustive example and illustrated by the appended drawings, of which:

FIG. 1 is a block diagram of an encoder according to the invention, and

FIG. 2 is a block diagram of a decoder according to the invention.

The invention is explained below with reference to the compression of digital data corresponding to angiographic images, but it is to be understood that the invention is not limited to an application of this type, and may be used in all cases where data must be compressed by the use of a digital code of variable code length.

DESCRIPTION OF THE PREFERRED EMBODIMENT

Measurements made on various digitalized andiographiv images have shown that, when encoding each pixel of an image of this type, it is necessary to take into account the maximum possible number of pixels in the same image or in successive images neighbouring each encoded pixel of the image in order to increase the compression rate of the encoding done. Thus, if a pixel X is encoded in taking into account solely the preceding pixel Y (differential encoding), a compression rate (ratio of the number of bits resulting from the digitalization of a pixel to the number of bits after encoding) of about two if no distortion is tolerated. If both the pixel Y, preceding the encoded pixel, and the pixel Z of the same rank of the preceding line analyzed (conditional encoding) are taken into account, it is possible to obtain a compression rate of about 4. This is, of course, because the images concerned are not "white noise" images (i.e. images in which the values of successive pixels are random values), but images for which the successive pixels exhibit a high correlation.

If we digitalize an angiographic image with a resolution of 8 bits for example (256 levels of values), then for the conditional encoding of the pixels, taking into account the two neighbouring pixels, there must be an encoding memory with a capacity of $2^8.2^8 = 2^{16}$ values of codes possible if no information is to be lost, each of them having to encode 256 possible values of the pixel X. Thus, the conventional use of 65,536 variable-length codes, such as the HUFFMAN codes (which can range from 1 to 16 bits for example) makes it possible to obtain the compression rate value referred to above but, in the present state of technology, would call for a prohibitive number of memory circuits. As explained above, the present invention makes it possible to considerably reduce the number of circuits needed for an encoding of this type.

To avoid using a memory of encoded values of this scale, the present invention proposes firstly to distribute all the pairs of values (Y, Z) among a smaller number of encoding classes, and then to combine, under a single prefix, several values which are distinguished by a suffix. Several combinations have been tested with a large number of real angiographic images, and it has been found that the following distribution among 61 classes provides the best compromise between efficiency of compression and ease of execution:

| Y | Y−Z | | | | | | | |Y−Z| ≧ 4 |
|---|---|---|---|---|---|---|---|---|
| | −3 | −2 | −1 | 0 | 1 | 2 | 3 | |
| 0 | 5 | 6 | 7 | 0 | — | — | — | 4 |
| 1 ≦ Y ≦ 15 | 13 | 14 | 15 | 8 | 9 | 10 | 11 | 12 |
| 16 ≦ Y ≦ 31 | 21 | 22 | 23 | 16 | 17 | 18 | 19 | 20 |
| 32 ≦ Y ≦ 47 | 29 | 30 | 31 | 24 | 25 | 26 | 27 | 28 |
| 48 ≦ Y ≦ 63 | 37 | 38 | 39 | 32 | 33 | 34 | 35 | 36 |
| 64 ≦ Y ≦ 79 | 45 | 46 | 47 | 40 | 41 | 42 | 43 | 44 |
| 80 ≦ Y ≦ 95 | 53 | 54 | 55 | 48 | 49 | 50 | 51 | 52 |
| 96 ≦ Y | 61 | 62 | 63 | 56 | 57 | 58 | 59 | 60 |

In the above table, which gives a code number on 6 bits (values from 0 to 63), according to the respective values of (Y-Z) and Y, the code numbers 1, 2 and 3 do not exist since the values of the pixels Y and Z can only positive or nil. For the code numbers 0, 5, 6 and 7, there are four HUFFMAN encodings which apply to the current pixel X, and for each of the other code numbers (4 and 8 to 63), an adapted HUFFMAN encoding applies to the difference $$X - \left(\frac{Y+Z}{2}\right).$$

Of course, the compression rate can be further increased by taking a greater number of pixels into account, but, in the context of the invention, this will require increasing the capacity of the encoding memory which is generally too high in view of the relatively low increase in the compression rate.

The encoder shown in FIG. 1 receives, at a terminal 1 of a digitalization device (not shown), a succession of binary data encoded on 8 bits in the present case, resulting from the line-by-line analysis of an angiographic image, and then from the digitalization of the values obtained. The value of the current pixel (the one that is being encoded) is called X, the value of the preceding pixel is called Y, and the value of the one with the same rank as the pixel X in the preceding line is called Z. Of course, it is possible to choose other pixels from among the neighbouring pixels of the current pixel, whether in the current image or in the preceding image in the sequence.

The terminal 1 of the encoder is connected to the input of a memory 2, which advantageously comprises a random-access memory, making it possible to memorize a number of values of pixels equal to the number of pixels of an image line analyzed. The memory 2 comprises two outputs 3, 4, at which there appear the current values Y and Z respectively for an incoming current value X; this happens through an addressing of the memory 2, the making of which is obvious to those skilled in the art.

The output 3 is connected to the addition input of an adder 5, the subtraction input of which is connected to the output 3. The output 4 is also connected to the input of the memory 6, which may be a read-only memory but is preferably a random-access memory. This memory 6 gives, according to the value of Y, a part of the code number (in fact, one of the eight rows of the above table) on three bits. The output of the adder 5 (on which the value Y-Z is received) is connected to the input of a memory 7 which, like the memory 6, may be a read-only memory, but is preferably a random-access memory. This memory 7 gives the other three bits of the code number, according to the eight classes of values of $$\frac{(Y-Z)}{2}.$$

The input 1 is furthermore connected to an input of a multiplexer 8 and to the addition input of an adder 9, the subtracting input of which is connected to the output 3. The output of the adder 9 is connected to the addition input of another adder 10, the other addition input of which is connected to the output of the adder 5 with a shift of one rank towards the less significant bits, so as to take up half the output value of the adder 5, namely (Y−Z)/2. The output of the adder 10 is connected to another input of the multiplexer 8.

The outputs of the memories 6 and 7 are connected firstly to a memory 11, the output of which is connected to the control input of the multiplexer 8 and secondly, conjointly with the multiplexer 8, to the input of a memory of codes 12. In the present case, the output of the adder 5 is defined on nine bits (the sign is taken into account) like the output of the multiplexer 8, and the memory 12 is therefore addressed on fifteen bits. The memory 11 controls the choice, by the multiplexer 8, of the value X (from the terminal 1) or else that of the value $$X - \left(\frac{Y+Z}{2}\right)$$

coming from the adder 10, according to the respective encoding classes (0, 5, 6, 7) or (4 and 8 to 63).

The memory 12, which is also preferably a random-access memory, gives a datum C at an output 13, this datum representing either the variable-length code or a prefix to which will be added, as a suffix, the value X of the current pixel (at the level of the register 16). In the present case, the datum C has a length L of fifteen bits at the most, and this datum C (determined on four bits) is presented at an output 14 of the memory 12. Finally, at a third output 15 of the memory 12, there is a datum P that indicates, on one bit, whether the information C is a variable-length code or a prefix.

The outputs 13 and 15 of the memory 12, as well as the terminal 1, are connected to the parallel inputs of a register 16, the series output of which is connected to the series input of another register 17. The parallel outputs (16 in the present case) of the register 17 are connected, through a buffer register 18, to a bulk memory 19 which may be, for example, a flexible disk unit. The link between the buffer 18 and the memory 19 can be made on eight or sixteen bits.

The outputs 14 and 15 of the memory 12 are connected to a controller 20 which may be, for example, a count-down unit which is itself connected to the command input of a clock 21. The ouput of the clock 21 is connected to the clock signals input of the registers 16 and 17 and to a counter 22 mounted as a counter that counts up to 16, the output of which is connected to the input LD of the command to load the register 18.

The formatter circuit connected downstream of the memory 12 works as follows. At the first incoming value of X, the register 16 is loaded from the memory 12 either with a prefix and the value of X through the input 1 or with the corresponding variable-length code. The controller 20 makes the clock 21 send a number of pulses equal to the length L1 of the data loaded in the register 16, as a result of which this first data is transferred to the L1 first cells of the register 17 (the cells nearest to the series input). If this length L1 is smaller than 16, the counter 22 does not reach its triggering value, and the register 17 contains (16-L1) bits of any value, and L1 code bits. At the second incoming value of X, the register 16 is loaded with the corresponding information with a length L2, and the controller 20 causes the clock 21 to transmit L2 pulses. If L2 is greater than (16-L1), as soon as the clock 21 has transmitted (16-L1) pulses, the counter 22 comes to 16 and transmits a signal at its output, ordering the register 17 to send its contents at its parallel outputs. These contents consist of the L1 bits of the information corresponding to the first pixel analyzed and the (16-L1) first bits of the information corresponding to the second pixel analyzed. These first sixteen bits are then loaded in the bulk memory 19. Of course, if L2 is smaller than (16-L1), the counter 22 is not triggered and the register 17 waits for the loading of other data from the register 16.

If L2 is greater than (16-L1), the (L2-(16-L1)) last bits of the second datum remain within the first cells of the register 17.

Then, a third datum with a length L3 is loaded in the register 16 and transferred serially into the register 17, and if this latter register receives at least sixteen bits of data, namely if (L1 +L2 +L3 - 16) is greater than or equal to 16, the contents of the register 17 are transferred to the memory 19. If not, the register 17 waits for the arrival of one or more additional, subsequent data until this condition is fulfilled.

This data concatenation process continues until the analysis of the image or images to be memorized is at an end, the last datum being advantageously followed by a number of additional clock signals which are sufficient to transfer it from the register 17 to the memory 19. These additional clock signals fill the register 17, on its series input side, with a succession of bits, for example, a sequence of "0s" resulting from the setting at "0" of the cells of the register 16. These additional clock signals may be produced by a device (not depicted), the making of which is obvious to those skilled in the art: it may, for example, be a device validated just after the analysis of the last pixel and may comprise a decoder that decodes the state E of the counter 22, sending (16-E) clock pulses in place of the clock 21 or forcing it to send them.

FIG. 2 shows the block diagram of a decoding circuit used to restore the original image from the data stored in the bulk memory 19. As will be seen, the decoding circuit described above takes up all the constituent elements of the circuit of FIG. 1 with, however, certain differences as regards connections. Thus, those skilled in the art can easily make both circuits with a single set of constituent elements, and can switch them over appropriately depending on whether encoder or a decoder is to be obtained. However, in order to avoid unnecessarily complicating the description and the drawing, these two circuits are described separately herein.

The bulk memory 19 is connected by a buffer 23 to the parallel input of a register 24, the series output of which is connected to the series input of another register 25. In the present case, the connection between the memory 19 and the buffer 23 can be made on 8 or 16 bits, and the connection between the buffer and the register 24 is made on 16 bits, the two registers 24 and 25 each having 16 cells. The parallel output of the register 25 is connected to the input of a decoder 26 comprising a read-only memory or, preferably, a random-access memory. The decoder 26 comprises an output 27 from which comes the decoded word $$X - \left( \frac{Y+Z}{2} \right)$$

on nine bits in the present case (value on eight bits and the sign), and one output 28 at which there is a datum on the length of the decoded word. This output 28 is connected to a controller 29 which comprises, for example, a count-down unit and which has its output connected to the control input of a clock 30. The output of the clock 30 is connected to the clock signal inputs of the registers 24 and 25, as well as to the input of a counter 31 mounted as a counter that counts up 16. The output of the counter 31, activated upon arrival at the state 16, is connected to the clock signals input of the buffer 23.

The output 27 (without the sign) of the decoder 26 is connected to an input of a multiplexer 32 as well as to the addition input of an adder 33 (with the sign), the output of which is connected to the input of another adder 34, the output of this latter adder being connected to another input of the multiplexer 32.

The output of the multiplexer 32 is connected to a terminal 35, at which the digitalized values of the pixels X (on eight bits in the present case) are received for subsequent treatment, and also to the input of a memory 36 which has the same characteristics as the memory 2. The output "Y" of the memory 36 is connected to the input of a memory 37 as well as to the input of an adder 38. The subtraction input of the adder 38 is connected to the output "Z" of the memory 36, and its output is connected to the input of a memory 39. The outputs of the memories 37 and 39 are connected to the input of the decoder 26, as well as to the input of a memory 40, the output of which is connected to the command input of the multiplexer 32. The characteristics of the memories 37, 39 and 40 are the same as those of the memories 6, 7 and 11 respectively.

The output "Y" of the memory 36 is connected to another input of the adder 33 and the output of the adder 38 is connected, with a shift by one bit value towards the less significant bits (division by 2) at the subtraction input of the adder 34.

To obtain the values of the successive pixels of an image from the memory 19 at the terminal 35, sections of eight or sixteen bits loaded in the buffer 23 are read in the order in which they have been stored therein. At the first loading of the buffer 23, a control device (not shown) sends it a clock pulse and its contents are transferred into the register 24. The controller 29 causes the clock 30 to send the registers 24 and 25 a number of pulses corresponding to the length of the code previously presented at the input of the decoder 26 and removes the code as soon as the decoder has given the decoded value X or X−(Y+Z)/2 at its output 27. The first encoded value present in the register 24 corresponds to the value X of the first pixel, and in this case, the controller 9 makes the clock 30 send 16 pulses to transfer it into the register 25. The decoder memory 26, which is preferably a random-access memory, receives at its addressing inputs, firstly, the six bits corresponding to the class of the code associated with the pair (Y,Z), and secondly, the first 8 bits of the contents of the register 25. The value appearing at the output 27 of the decoder 26 is sent to the multiplexer firstly directly (without its sign) and secondly, through the adders 33 and 34, and the following value is obtained at the output of this latter adder when the value presented at the output of 27 is $$X - \left(\frac{Y+Z}{2}\right):$$

$$X - \left(\frac{Y+Z}{2}\right) + Y - \left(\frac{Y-Z}{2}\right) = X,$$

the multiplexer 32 being flipped over towards the output of 34 (since at the encoding of the same pixel, this same value $$X - \left(\frac{Y+Z}{2}\right).$$

had been recorded). If the value X is got directly at the output 27, the multiplexer is flipped towards this output (this same value having been recorded at the encoding stage). Thus, the same successive values of the pixels X are recovered at the output 35 as those that had been sent to the input 1 of the encoder.

The value that appears at the output 28 of the decoding memory 26 is sent to the controller 29 to inform it of the length, on four bits, of the code acknowledged in the first 8 bits of the register 26.

What is claimed is:

1. A device for the compression of digital image signals by conditional encoding without loss of data, comprising a shift memory with at least two outputs at which, for each incoming pixel value, the values of the neighbouring values are presented, these outputs being each connected to a memory giving a code number, these two memories being connected to a device for the formatting and concatenation of codes.

2. A device according to the claim 1 wherein the code number memories are also linked to the command input of a multiplexer through another memory, one of the inputs of the multiplexer receiving the incoming pixel values and the other receiving a value $$X - \left(\frac{Y+Z}{2}\right)$$

which is a function of the difference between the incoming pixel values and the neighbouring pixel values, the output of this multiplexer being also connected to a compressed codes memory.

3. A device according to any of the claims 1 or 2, wherein the formatting device comprises two series-connected registers, the parallel input of the first register being connected to the compressed codes memory and the parallel output of the second register being connected to a bulk memory, the clock signal inputs of these two registers being connected to a clock controlled by a controller connected to the output of the codes memory.

4. A device according to any of claims 1 or 2 further comprising a modification means for modifying connections of said shift memory, said code number memories and said formatting device whereby data stored in the bulk memory can be decoded.

* * * * *